(12) United States Patent
Ito et al.

(10) Patent No.: US 8,824,860 B2
(45) Date of Patent: Sep. 2, 2014

(54) PROGRAM DELIVERY CONTROL SYSTEM AND PROGRAM DELIVERY CONTROL METHOD

(75) Inventors: Takafumi Ito, Kanagawa (JP); Naomi Egashira, Kanagawa (JP); Tomoyuki Yamamoto, Kanagawa (JP); Kazunori Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 681 days.

(21) Appl. No.: 12/786,965

(22) Filed: May 25, 2010

(65) Prior Publication Data
US 2010/0332919 A1 Dec. 30, 2010

(30) Foreign Application Priority Data
Jun. 24, 2009 (JP) .................... 2009-149602

(51) Int. Cl.
*G11B 27/00* (2006.01)
*H04H 60/04* (2008.01)
*G11B 27/11* (2006.01)
*H04H 20/12* (2008.01)
*G11B 27/34* (2006.01)
*H04H 60/06* (2008.01)

(52) U.S. Cl.
CPC .............. *G11B 27/34* (2013.01); *H04H 60/04* (2013.01); *G11B 27/11* (2013.01); *H04H 60/06* (2013.01); *H04H 20/12* (2013.01)
USPC ............................ 386/263; 386/248; 386/281

(58) Field of Classification Search
USPC ................................. 386/263, 281, 248, 282
See application file for complete search history.

(56) References Cited

U.S. PATENT DOCUMENTS

| 7,349,663 | B1 * | 3/2008 | Joseph .................... 455/3.02 |
| 8,281,344 | B1 * | 10/2012 | Mathias ...................... 725/74 |
| 2008/0005179 | A1 * | 1/2008 | Friedman et al. .......... 707/104.1 |
| 2008/0065782 | A1 * | 3/2008 | Jones .......................... 709/240 |
| 2009/0175591 | A1 * | 7/2009 | Gondhalekar et al. .......... 386/83 |
| 2009/0257729 | A1 * | 10/2009 | Ahn .............................. 386/46 |
| 2012/0131506 | A1 * | 5/2012 | Sakata et al. ................. 715/823 |

FOREIGN PATENT DOCUMENTS

| JP | 10-190596 | 7/1998 |
| JP | 10-229508 | 8/1998 |
| JP | 2005-101701 | 4/2005 |

\* cited by examiner

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

A program delivery control system includes: a storage section that stores a playlist indicating a play order of items forming a program; an apparatus control section that controls an apparatus on the basis of the playlist stored in the storage section and that causes the storage section to store error information sent from the apparatus in correlation with the apparatus that issued the error information; and a playlist display control section that performs control so as to display the playlist stored in the storage section on a screen with an item being played indicated as such and, in a case where the error information is stored, with an item for which the apparatus that issued the error information is necessary provided with an error indication.

17 Claims, 9 Drawing Sheets

PROGRAM DELIVERY CONTROL SYSTEM AND PROGRAM DELIVERY CONTROL METHOD

BACKGROUND OF THE INVENTION

1. Field of the Invention

The present invention relates to a program delivery control system and a program delivery control method. More specifically, the present invention relates to a program delivery control system and a program delivery control method that display error information on an apparatus on display of a playlist.

2. Description of the Related Art

A program delivery control system causes items forming a program segment to sequentially progress in accordance with a displayed cue sheet (playlist). In cues (items) in each segment, a plurality of apparatuses (such as VTRs) are utilized to deliver a scheduled broadcast content. In the case where an abnormality occurs in an apparatus to be used, the abnormality of the apparatus is displayed on a display device.

Japanese Unexamined Patent Application Publication No. 10-190596 discloses a technique for detecting a failure or the like of an apparatus in a system to change the assignment of apparatuses. Japanese Unexamined Patent Application Publication No. 2005-101701 discloses a technique for use in a broadcast material delivery system for displaying a warning screen in the case where an abnormality of a sound channel is detected. Japanese Unexamined Patent Application Publication No. 10-229508 discloses a technique for use in an error monitoring system for detecting an error from information sent from an apparatus to display an error indication through a change in display of an icon or through a status bar.

SUMMARY OF THE INVENTION

However, it may be difficult for an operator to determine in accordance with the status of an error of an apparatus whether the error immediately affects broadcast or there is enough time to treat the error before the apparatus is utilized in broadcast. As a result, a program may not be broadcast on schedule.

It is desirable to provide a technique allowing adequate recognition of how an error having occurred in an apparatus used in a program delivery control system affects broadcast of a program which is a permutation of a plurality of segments.

According to an embodiment of the present invention, there is provided a program delivery control system including: a storage section that stores a playlist indicating a play order of items forming a program; an apparatus control section that controls an apparatus on the basis of the playlist stored in the storage section and that causes the storage section to store error information sent from the apparatus in correlation with the apparatus that issued the error information; and a playlist display control section that performs control so as to display the playlist stored in the storage section on a screen with an item being played indicated as such and, in a case where the error information is stored, with an item for which the apparatus that issued the error information is necessary displayed with an error indication.

According to the embodiment of the present invention, when an error occurs in an apparatus necessary for broadcast, an error indication is displayed for an item on the playlist to which the apparatus is relevant. This allows a user referencing the playlist to easily recognize which forthcoming item is affected by the error of the apparatus.

The apparatus control section may determine an order of priority in accordance with a content of an error when the error information sent from the apparatus is received. In the case where information on the order of priority is added in correlation with the error information, the playlist display control section may cause the playlist to be displayed on the screen with the error information displayed in accordance with the order of priority.

In response to a user selecting the item with the error indication on the playlist displayed on the screen, the playlist display control section may perform control so as to display a content of the error information corresponding to the selected item on the screen.

In the case where a plurality of pieces of error information are added in correspondence with one item, the pieces of error information are displayed in accordance with the order of priority.

According to another embodiment of the present invention, there is provided a program delivery control method including the steps of: controlling an apparatus on the basis of a playlist indicating a play order of items forming a program; receiving and storing error information sent from the apparatus; and selecting an item on the playlist for which the apparatus is necessary to store the error information in correlation with the selected item.

According to the embodiment of the present invention, it is possible to add error information on an apparatus necessary for broadcast to the playlist on the basis of the playlist.

According to still another embodiment of the present invention, there is provided a program delivery control method including the steps of: reading a playlist indicating a play order of items forming a program from a storage section; and when the read playlist is displayed on a screen and in a case where error information on an apparatus corresponding to an item on the playlist is stored, displaying an error indication at a position of the item corresponding to the error information.

According to the embodiment of the present invention, it is possible to display an error indication at an item on the playlist in accordance with error information on an apparatus added to the playlist.

The present invention makes it possible to easily recognize which item to be broadcast an apparatus in which an error has occurred is used in accordance with an error indication for the apparatus correlated with an item on a playlist. The present invention also makes it possible to visually recognize the time from the item being currently broadcast to an item for which an apparatus in which an error has occurred is used, and to easily determine the degree of influence of the error of the apparatus.

DESCRIPTION OF THE PREFERRED EMBODIMENTS

An embodiment of the present invention will be described below. The description will be made in the following order.

1. Program Delivery Control System (Exemplary System Configuration, Exemplary Apparatus Setting Operation, Exemplary Playlist Preparation Operation, and Exemplary Program Delivery Operation)
2. Exemplary Display of Playlist (Exemplary Display of Entire Playlist and Exemplary Error Indication)
3. Program Delivery Control Program (Exemplary Hardware Configuration, Flow of Information, and Process Performed in Playlist Database)

<1. Program Delivery Control System>
[Exemplary System Configuration]

Figure 1:
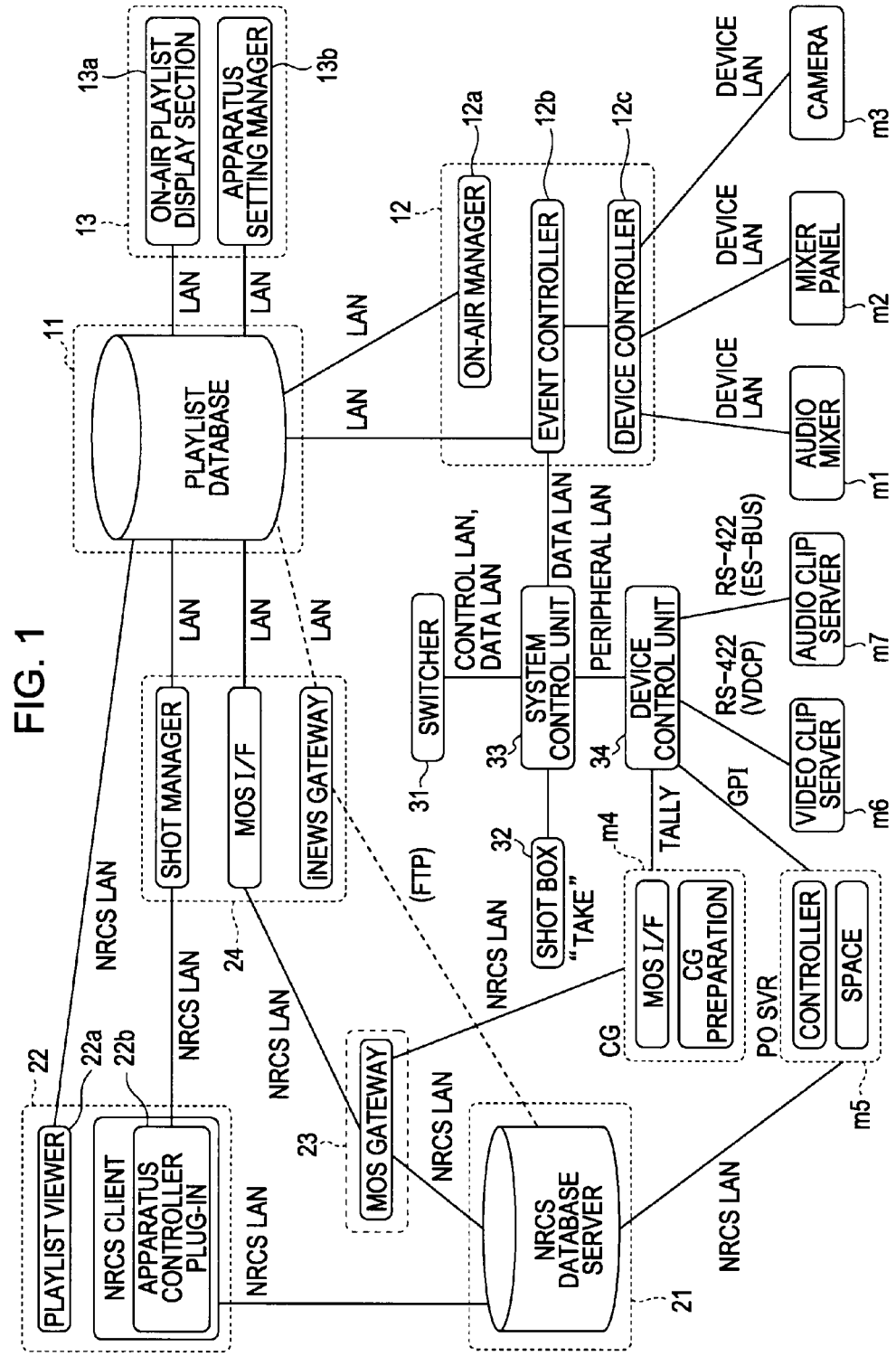
FIG. 1 shows an exemplary configuration of a program delivery control system according to an embodiment.

FIG. 1 shows an exemplary configuration of a program delivery control system according to an embodiment. The program delivery control system according to the embodiment mainly includes a playlist database (storage section) 11 that stores a playlist and associated information, an apparatus controller (apparatus control section) 12 that controls an apparatus necessary for broadcast on the basis of the playlist, and a list display computer (playlist display control section) 13 that controls display of the playlist on a screen. Besides the above main components, the entire program delivery control system also includes an NRCS (News Room Computer System) database server 21, an NRCS client 22, a MOS gateway 23, and a switcher 31. Components surrounded by frames in broken lines in the drawing may be formed by a computer.

The playlist contains information indicating the broadcast order of items (also referred to as "cues") forming a program, and is also called a "cue sheet". Examples of apparatuses necessary for broadcast include an audio mixer m1, a mixer panel m2, and a camera m3 connected to the apparatus controller 12 side, and a CG (computer graphics) output device m4 and a playout server m5 connected to an NRCS network (NRCS LAN), and a video clip server m6 and an audio clip server m7 connected to the switcher 31 side. These apparatuses are exemplary, and various types of apparatuses that store, output, and generate broadcast materials may be connected.

The playlist database 11 is connected to the apparatus controller 12, the list display computer 13, and the NRCS client 22 via a network such as a LAN. This allows the apparatus controller 12, the list display computer 13, and the NRCS client 22 to input and output a playlist to and from the playlist database 11 via the network. The playlist database 11 is also connected to the NRCS database server 21 via an interface section 24 and the MOS gateway 23. This allows database coordination between the playlist database 11 and the NRCS database server 21.

The apparatus controller 12 includes an on-air manager 12a, an event controller 12b, and a device controller 12c. The apparatus controller 12 is formed by a computer, and the on-air manager 12a, the event controller 12b, and the device controller 12c are implemented by software executed by the computer.

The on-air manager 12a manages on-air delivery. That is, the on-air manager 12a causes the apparatus controller 12 to start or the like in response to an operation for starting or terminating a playlist in order to perform a playlist standby or termination process.

The event controller 12b executes an event in a playlist. That is, the event controller 12b issues a command on operation of an apparatus necessary at the next standby time to the device controller 12c on the basis of the playlist stored in the playlist database 11.

The event controller 12b also issues a command on a series of operations to be performed during an on-air (TAKE) time. That is, the event controller 12b receives a "TAKE" command issued by the operator using a shot box 32 on the switcher 31 side to notify the device controller 12c of an on-air timing. In this case, the event controller 12b notifies the device controller 12c of an on-air timing by generating and transmitting a symbolic command/time line.

The event controller 12b also stores the status of the apparatuses in the playlist database 11. In the case where some trouble occurs in an apparatus (for example, m1 to m7), error information is delivered from the apparatus. In response to receiving the error information delivered from the apparatus, the event controller 12b performs control so as to add the error information to an item which is on the playlist stored in the playlist database 11 and for which the apparatus that delivered the error information is necessary. In some cases, the event controller 12b may perform the same operation when communication with an apparatus is not established as when error information is received from the apparatus, even if no error information is received from the apparatus.

When error information sent from an apparatus is received, the event controller 12b determines the order of priority in accordance with the content of the error to add information on the determined order of priority to the playlist in correlation with the error information.

The event controller 12b receives not only error information sent from the apparatuses connected via the device controller 12c (such as the audio mixer m1, the mixer panel m2, and the camera m3), but also error information sent from the apparatuses connected to the switcher 31 side (such as the video clip server m6 and the audio clip server m7) and the apparatuses connected via a network according to a MOS protocol (such as the CG output device m4 and the playout server m5). Therefore, the event controller 12b receives error information in protocols corresponding to the various types of apparatuses. The event controller 12b then adds error information in a unique form corresponding to the format of the playlist on the basis of the received error information.

The device controller 12c controls the apparatuses. That is, the device controller 12c controls the apparatuses by interpreting a symbolic command abstracted independently of the types of the apparatuses and converting the symbolic command into a predetermined protocol for each apparatus. The device controller 12c also converts the protocol into an abstracted status to notify the event controller 12b. The device controller 12c also keeps the time line of the symbolic command to perform synchronous control in accordance with the on-air timing (TAKE).

The list display computer 13 includes an on-air playlist display section 13a and an apparatus setting manager 13b. The on-air playlist display section 13a and the apparatus setting manager 13b are implemented by a program executed by a computer.

The on-air playlist display section 13a performs control so as to read a playlist on air from the playlist database 11 and display the playlist on a screen (monitor). The apparatus setting manager 13b is a module that registers the settings for the apparatuses. The apparatus setting manager 13b prepares a software button integrating a series of operations performed by the apparatuses, and has the software button assigned to an item on the playlist.

In the embodiment, in the case where error information on an apparatus is added to a playlist on air, the on-air playlist display section 13a displays the playlist on the screen with an error indication displayed at the position of an item on the playlist corresponding to the error information.

Also, in the case where information on the order of priority is added in correlation with the error information, the on-air playlist display section 13a displays a playlist on the screen in accordance with the information on the order of priority. Specifically, in the case where a plurality of pieces of error information are added in correlation with items on the playlist displayed on the screen and each error information is correlated with an order of priority, the plurality of pieces of error information are displayed in accordance with the order of priority.

In the case where a plurality of pieces of error information are added in correlation with items on the playlist displayed on the screen and each error information is correlated with an order of priority, the on-air playlist display section 13a may change the form of error indications in accordance with the order of priority. For example, error information with a higher order of priority may be displayed in a more conspicuous way (flashed or colored).

When the operator selects an item with an error indication on the playlist displayed on the screen, the on-air playlist display section 13a performs control so as to display the detailed content of the error information corresponding to the selected item.

The on-air playlist display section 13a updates the displayed playlist at a predetermined timing. That is, the status of the apparatuses is sent to the event controller 12b at all times so that the event controller 12b updates information on the playlist. Therefore, the on-air playlist display section 13a updates the playlist to reflect the latest information.

For example, the on-air playlist display section 13a updates the error information added to the playlist displayed on the screen at a timing at which items to be broadcast on the displayed playlist progress. Alternatively, the on-air playlist display section 13a may update information on the playlist at time intervals set in advance, when a command for an update is received from the operator, or when a message indicating that the playlist on air has been changed is received.

The NRCS client 22 is connected to the playlist database 11 and the NRCS database server 21 via an NRCS network according to the MOS protocol. The MOS protocol is mainly used to operate a video-based server placed in a news room from an NRCS by remote control, and is based on the XML (Extensible Markup Language) to allow unique extension tags.

A playlist viewer 22a and an apparatus controller plug-in 22b are installed on the NRCS client 22. The playout server m5 is connected to the NRCS database server 21 via an NRCS network according to the MOS protocol.

The playout server m5 is a video server that stores materials that are renewed from day to day, and is desired to provide high performance in order to be used for editing purposes. The playout server m5 includes a playlist and a MOS interface.

The NRCS database server 21 is connected via the MOS gateway 23 to the interface section 24, and via the interface section 24 to the playlist database 11. The MOS gateway 23 is a gateway that connects apparatuses in compliance with the MOS protocol (such as the CG output device m4 and the NRCS database server 21) to a network.

The interface section 24 is an interface that connects the various sections on the NRCS side and the apparatuses on the apparatus controller 12 side. That is, the interface section 24 coordinates between the MOS protocol on the NRCS side and a network such as a LAN on the apparatus controller 12 side for connection between each other.

The switcher 31 is connected to a system control unit 33, and via the system control unit 33 to a device control unit 34 and the shot box 32. The switcher 31 handles video signal systems (for example, SDI transfer) (not shown) to receive, switch between, synthesize, and apply a special effect to a large number of video inputs and provide various outputs to a large number of video outputs. The switcher 31 is also called an "effect switcher". The switcher 31 is controlled by the system control unit 33. In some cases, an operation input section that allows manual operation of the switcher 31 may be provided in addition. Video signals from apparatuses with a video output such as the video clip server m6 and the playout server m5 are input to the switcher 31, and an output of the switcher 31 is sent to a monitor, delivered to be broadcast, and so forth. The system control unit 33 sends a command to the switcher 31, sends a command to each apparatus via the device control unit 34, and notifies the event controller 12b on the basis of a switching command sent from the shot box 32. The system control unit 33 also relays communication between the event controller 12b and other connection destinations.

The shot box 32 is an operation console provided with a plurality of switches. The operator operates a switch on the shot box 32 at a predetermined timing to switch between the apparatuses. The device control unit 34 includes various communication interfaces to serve as an interface with various types of apparatuses. The video clip server m6 and the audio clip server m7 are connected to the device control unit 34 via a serial communication line (such as RS-422). The device control unit 34 is connected to the MOS apparatuses on the NRCS side through a parallel interface to notify the MOS apparatuses of a timing of a command from the shot box 32 or the event controller 12b.

[Exemplary Apparatus Setting Operation]

Figure 2:
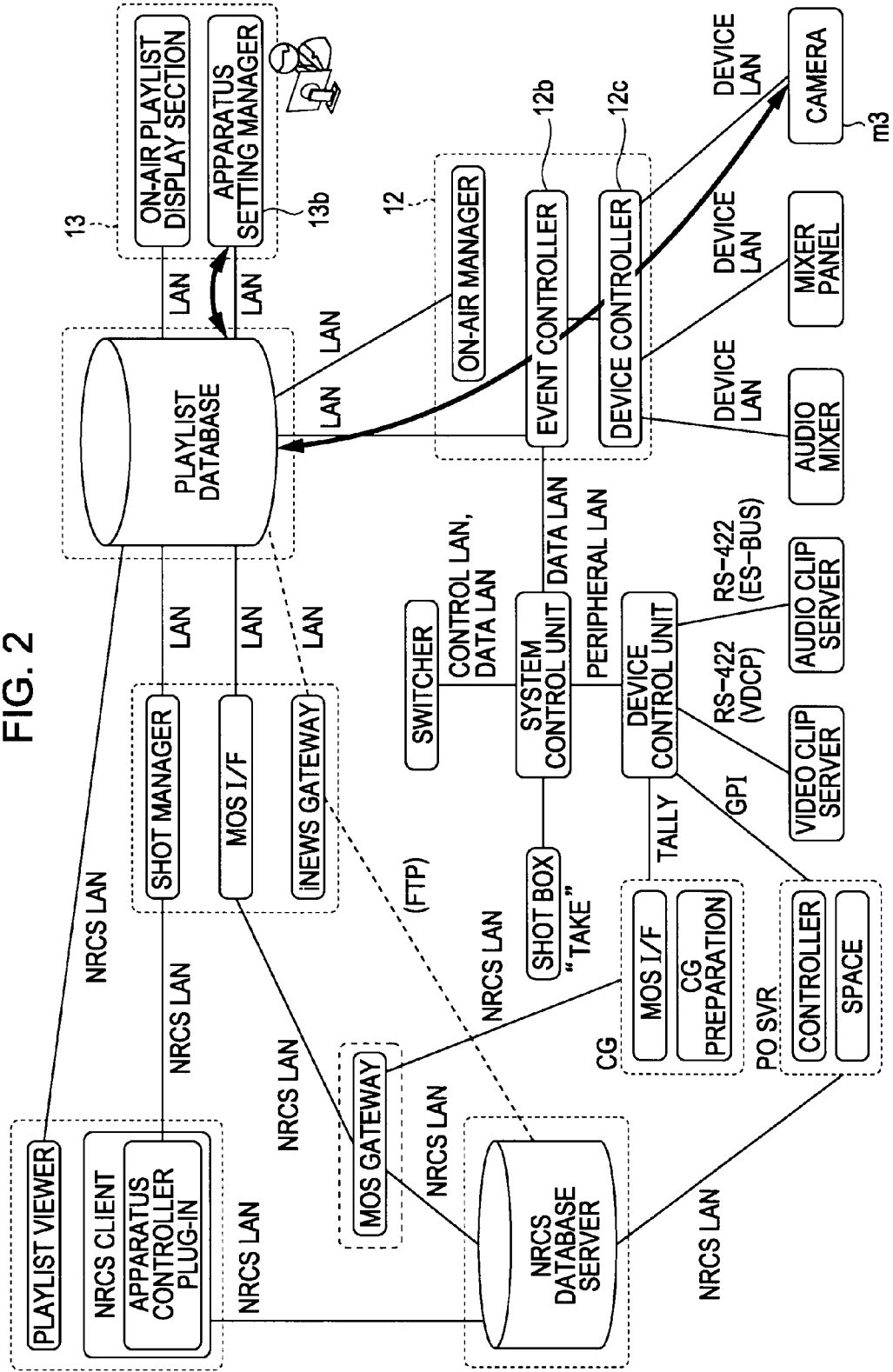
FIG. 2 illustrates exemplary apparatus setting operation performed by an apparatus setting manager.

FIG. 2 illustrates exemplary apparatus setting operation performed by the apparatus setting manager 13b. The apparatus setting manager 13b is a program executed by the list display computer 13 to register the settings of functions and operations of various types of apparatuses.

The operator starts the apparatus setting manager 13b through the list display computer 13. When the apparatus setting manager 13b is started and receives a command to start setting of a desired apparatus (for example, the camera m3) from the operator, the apparatus setting manager 13b searches the playlist database 11. In the case where the settings of the relevant apparatus have already been registered, the setting information is read and displayed on the screen.

In the case where no setting information has been registered yet, information on the relevant apparatus is taken into the playlist database 11. That is, the apparatus setting manager 13b requests the event controller 12b of the apparatus controller 12 to acquire information on the relevant apparatus. The event controller 12b sends this request to the relevant apparatus via the device controller 12c, and returns a response from the relevant apparatus to the playlist database 11. The apparatus setting manager 13b extracts information on the relevant apparatus sent from the event controller 12b to the playlist database 11 to display the information on the screen.

When the operator references the display on the screen and sets desired functions and operations to specify operations to be registered, the apparatus setting manager 13b prepares a software button integrating the set functions and operations to register the prepared software button in the playlist database 11.

[Exemplary Playlist Preparation Operation]

Figure 3:
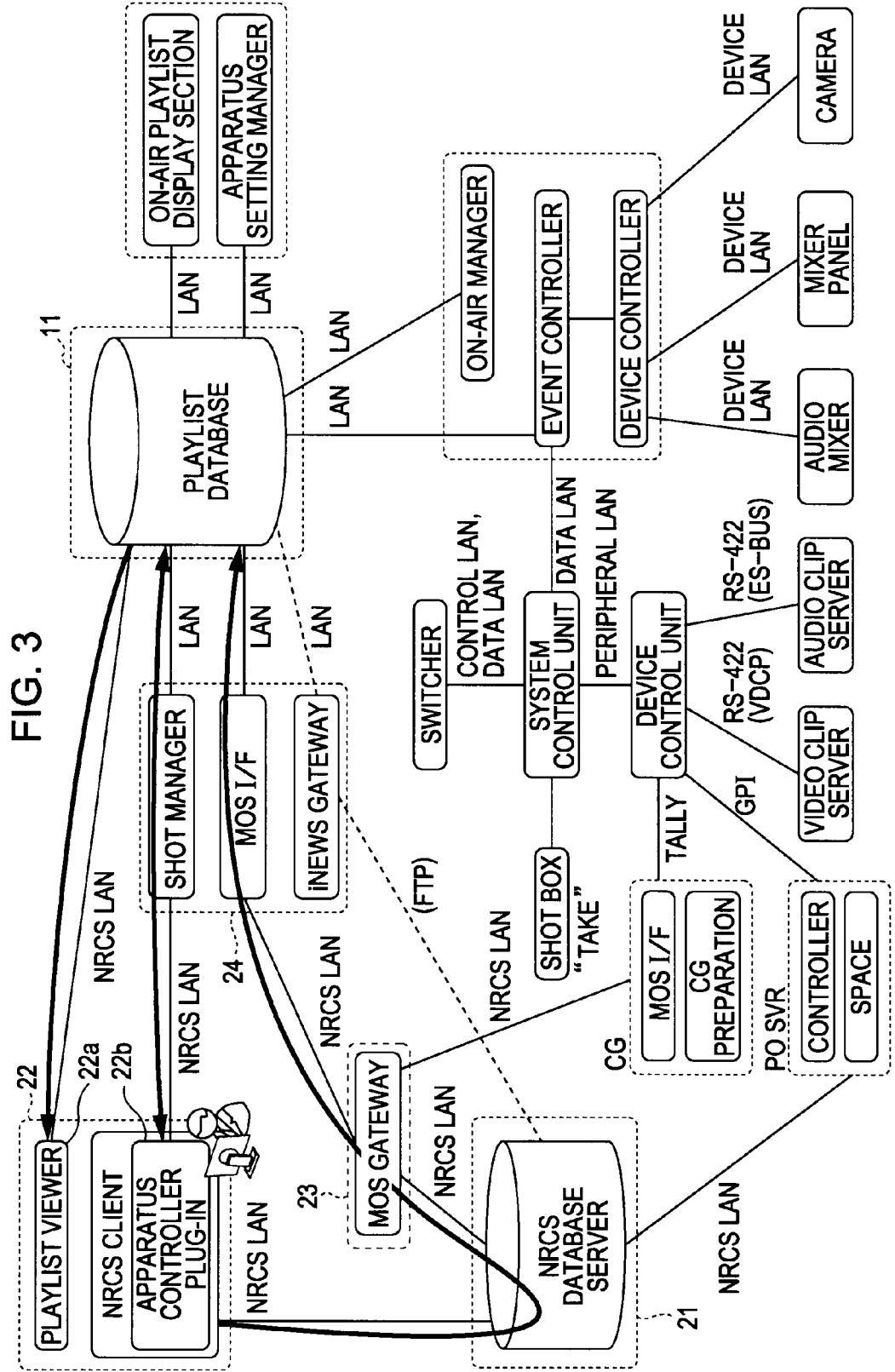
FIG. 3 illustrates exemplary playlist preparation operation.

FIG. 3 illustrates exemplary playlist preparation operation. In the drawing, a playlist is prepared by the playlist viewer 22a executed by the computer implementing the NRCS client 22. However, a playlist may be prepared by a different computer such as the list display computer 13.

First, the operator of the computer implementing the NRCS client 22 starts the playlist viewer 22a to read information on a playlist from the playlist database 11. At this time, in the case where a new playlist is to be prepared, template data stored in the playlist database 11 are read. Meanwhile, in the case where an already registered playlist is to be edited, data on the subject playlist are read.

The playlist viewer 22a displays the playlist read from the playlist database 11 on the screen. The operator of the computer implementing the NRCS client 22 references the playlist displayed on the screen to construct (edit) items on the playlist.

When the operator issues a command to construct (edit) the playlist, the apparatus controller plug-in 22b of the NRCS client 22 constructs (edits) an item by correlation with an item in the NRCS database server 21 contained in the command. When the operator issues a command to register the constructed (edited) playlist, the apparatus controller plug-in 22b transfers the constructed (edited) playlist via a network to the playlist database 11 for registration.

The items registered in the playlist database 11 are correlated with the items in the NRCS database server 21 so as to be synchronized with the latter items via the MOS gateway 23 and the interface section 24 when the former items are executed.

[Exemplary Program Delivery Operation]

Figure 4:
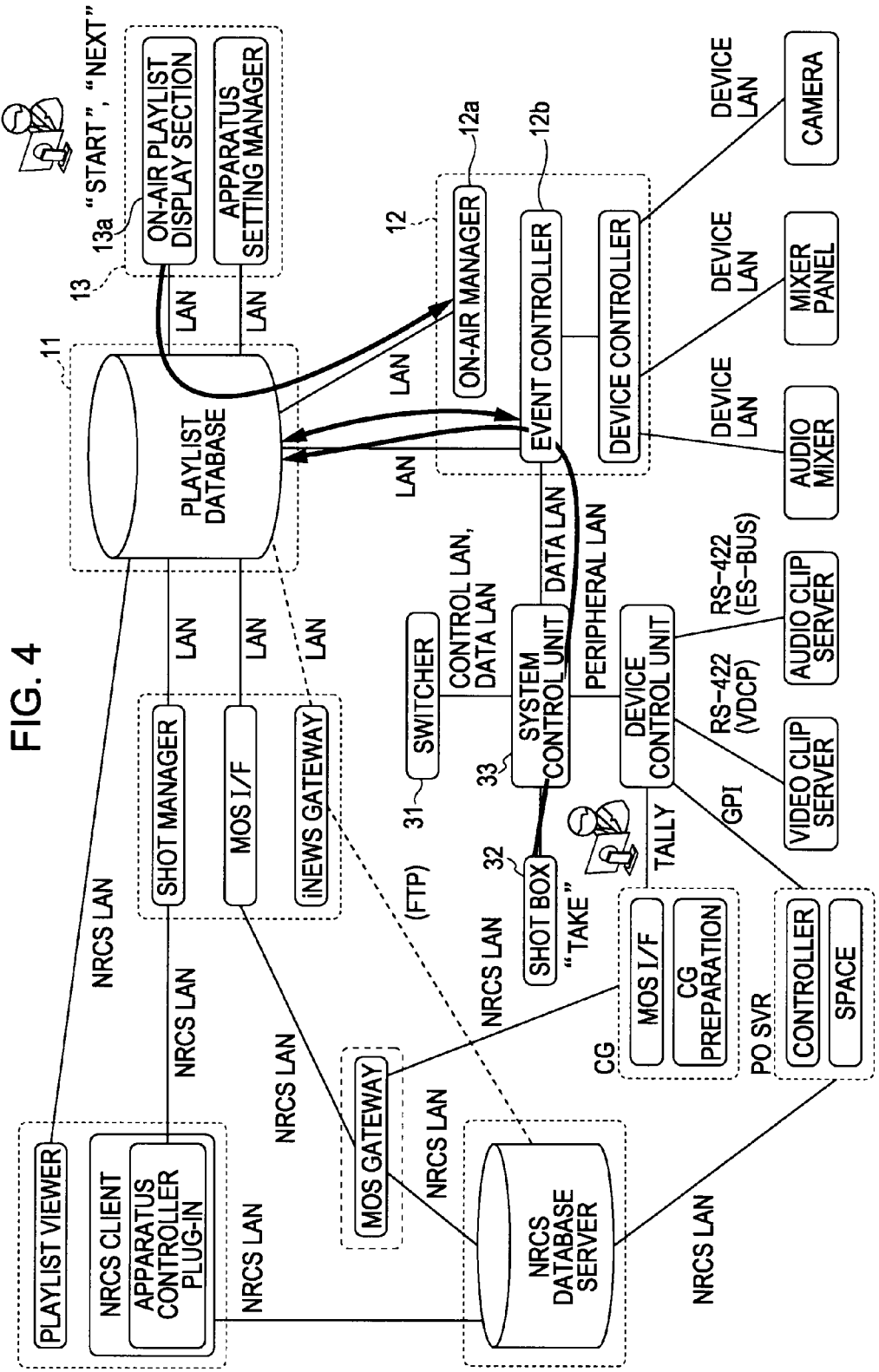
FIG. 4 shows exemplary program delivery operation.

FIG. 4 shows exemplary program delivery operation. First, the list display computer 13 starts the on-air playlist display section 13a to read the playlist of a program to be delivered from the playlist database 11 for display on the screen. The operator of the list display computer 13 issues a command to "START" on-air delivery on the basis of the playlist displayed on the screen. The command is sent from the playlist database 11 to the on-air manager 12a of the apparatus controller 12.

When the on-air manager 12a receives the command to "start" on-air delivery, the event controller 12b of the apparatus controller 12 reads the playlist of the program to be delivered from the playlist database 11 to control an apparatus necessary for an item on the playlist.

When the operator operates the shot box 32 on the switcher 31 side to press a "TAKE" button, the event controller 12b of the apparatus controller 12 reads information on the next item on the playlist from the playlist database 11. The event controller 12b then controls an apparatus necessary for the read item. By sequentially repeating this process over the items on the playlist, the content of the program is delivered in accordance with the order of the items on the playlist.

<2. Exemplary Display of Playlist>

[Exemplary Display of Entire Playlist]

Figure 5:
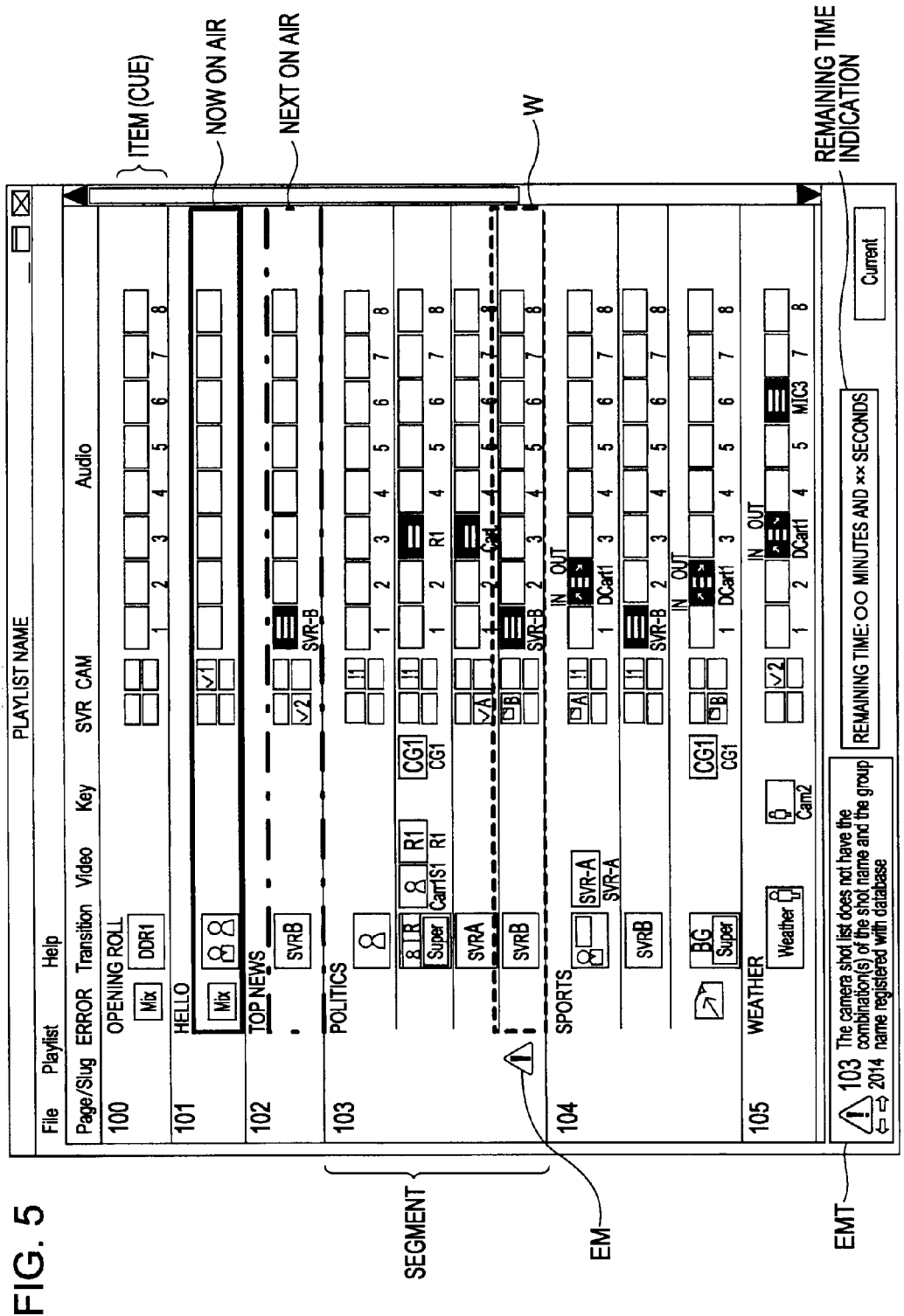
FIG. 5 shows exemplary display of an entire playlist.

FIG. 5 shows exemplary display of the entire playlist. The playlist on air is displayed on the screen of the list display computer 13 as shown in FIG. 5. The on-air playlist is displayed in the form of a list in which each line corresponds to each item. The content of the items (cues) is broadcast sequentially in the order from top to bottom.

The items are registered for each segment in a program. The segments are provided with respective numbers, and the items are assigned in correspondence with the numbers of the segments. In the example shown in FIG. 5, the segments are sequentially numbered 100, 101, 102, ..., and the items are assigned to each segment. The display area is limited by the size of the screen, and segments and items that are not shown are displayed by operating a scroll bar.

One or a plurality of items are assigned to each segment. Each segment is provided with a title and graphics representing the content of the items. The content of the items includes "Page/Slug", "ERROR", "Transition", "Video", "Key", "SVR", "CAM", and "Audio". The "Page/Slug" field shows the number and the name of the segment. The "ERROR" field shows an error indication to be discussed later. The "Transition" field shows the type of transition of the screen. The "Video" field shows the settings of the video to be delivered. The "Key" field shows the settings of the video to be superimposed by a keyer using the switcher 31. The "SVR" field shows the status of the server acquired from the NRCS side. The "CAM" field shows the status of the camera. The "Audio" field shows the settings of the material and the level for each sound channel.

In the display of a playlist on air, the item currently on air is colored so that the item on air is visually clearly identifiable. The next item is colored in a different color so as to be visually clearly identifiable as the next item to be on air. The item on air (item being broadcast) may be marked with a string of characters such as "On Air" or "Under Delivery" or a graphic.

[Exemplary Error Indication]

Each item on the playlist is provided with the "ERROR" field. An error indication EM may be shown in the "ERROR" field. That is, in the case where the event controller adds error information to a playlist, the on-air playlist display section having read the playlist displays the error indication EM in the "ERROR" field of an item corresponding to the added error information.

Figure 6:
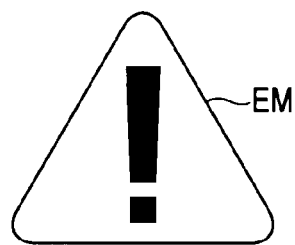
FIG. 6 shows an exemplary error indication.

FIG. 6 shows an exemplary error indication EM. The error indication EM is represented by a graphic that is used to indicate the presence of an error. For example, a graphic with an exclamation mark in a yellow triangle as shown in FIG. 6 may be used to make the occurrence of an error visually easily recognizable.

In the example shown in FIG. 5, the error indication EM is displayed in the "ERROR" field of the lowermost one of the items forming the segment numbered 103. When the operator references the display of the playlist on the screen and moves a selection frame W onto the item with the error indication EM in its "ERROR" field or gives a command by clicking a mouse button, for example, with the selection frame W moved onto such an item, the detailed content of the error may be displayed.

Figure 7:
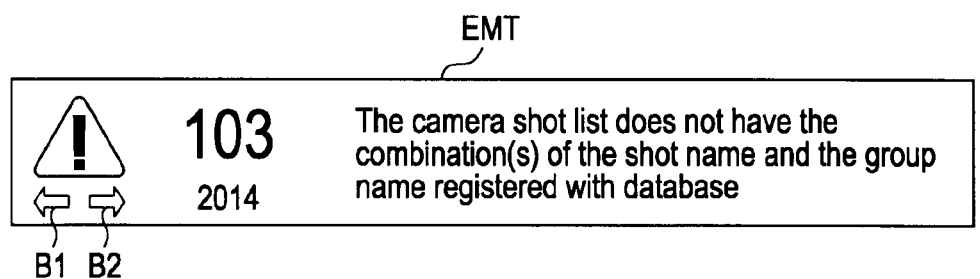
FIG. 7 is an enlarged view of an error monitor field.

The content of the error is displayed in an error monitor EMT field located at the bottom of the display area, for example. FIG. 7 is an enlarged view of the error monitor field. In the error monitor EMT field, the number of the segment formed by an item with an error, the number of the error, and the specific content of the error are indicated in characters. The operator references the content of the error monitor EMT to recognize what kind of trouble is occurring in an apparatus necessary for an item to be broadcast. This allows to adequately treat the apparatus with the trouble before broadcast.

In the case where a plurality of pieces of error information are added in correlation with items on the playlist and each error information is correlated with an order of priority, the on-air playlist display section displays the content of the errors in accordance with the order of priority in the error monitor EMT field.

For example, in the case where a plurality of pieces of error information are received from apparatuses in correspondence with items on the playlist, the event controller of the apparatus controller determines the order of priority in accordance with the content of the errors. The order of priority is determined in accordance with the significance of the errors, which is decided in advance in correspondence with the content of the errors. The order of priority is thus determined in accordance with the content of the errors. In the case where a plurality of pieces of error information are received for the same item, the event controller registers the error information in the playlist with an order of priority added to each piece of error information.

In the case where a playlist with error information with an order of priority is obtained, the on-air playlist display section displays in the error monitor field the content of the errors in the order of priority sequentially from the error information with the highest order of priority. Specifically, when the operator moves the selection frame W onto an item with an error, the content of an error with the highest order of priority is first displayed in the error monitor field. When an arrow button B1 or B2 is operated with the content of an error displayed in the error monitor field as shown in FIG. 7, the content of an error with the next higher or lower order of priority is displayed.

In the case where a plurality of pieces of error information are added in correlation with items on the playlist displayed on the screen and each error information is correlated with an order of priority, the on-air playlist display section may change the form of error indications EM in accordance with the order of priority. For example, error information with a higher order of priority may be displayed in a more conspicuous way (for example, an error indication for the highest order of priority may be flashed or displayed in a different color from error indications with lower orders of priority).

The on-air playlist display section may also display the selection frame W in different forms in accordance with the order of priority of the error information. Further, in the case where the progress of the playlist is set on the basis of the time, the on-air playlist display section may calculate the remaining time from the item currently on air to an item correlated with error information to display the calculated remaining time in a decreasing manner on the screen. This allows accurate recognition of the remaining time until it is necessary to use the apparatus with the error, which helps select how to treat the error.

The on-air playlist display section updates the displayed playlist at a predetermined timing. That is, the status of the apparatuses is sent to the event controller at all times so that the event controller updates information on the playlist. In order to reflect the latest information in the playlist displayed by the on-air playlist display section, it is necessary for the on-air playlist display section to update the playlist.

For example, the on-air playlist display section accesses the playlist database at a timing at which items to be broadcast on the playlist displayed on the screen progress to find whether or not any new error information has been added to the displayed playlist. If it is found that new error information has been added, the error information is taken and reflected in the display. This allows an error indication to be displayed in the "ERROR" field for an item corresponding to the newly taken error information.

Alternatively, the on-air playlist display section may update information on the playlist at time intervals set in advance, when a command for an update is received from the operator, or when a message indicating that the playlist on air has been changed is received.

<3. Program Delivery Control Program>

Now, a program delivery control program according to the embodiment will be described. The program delivery control program according to the embodiment includes steps to be executed by a computer.

[Hardware Configuration]

Figure 8:
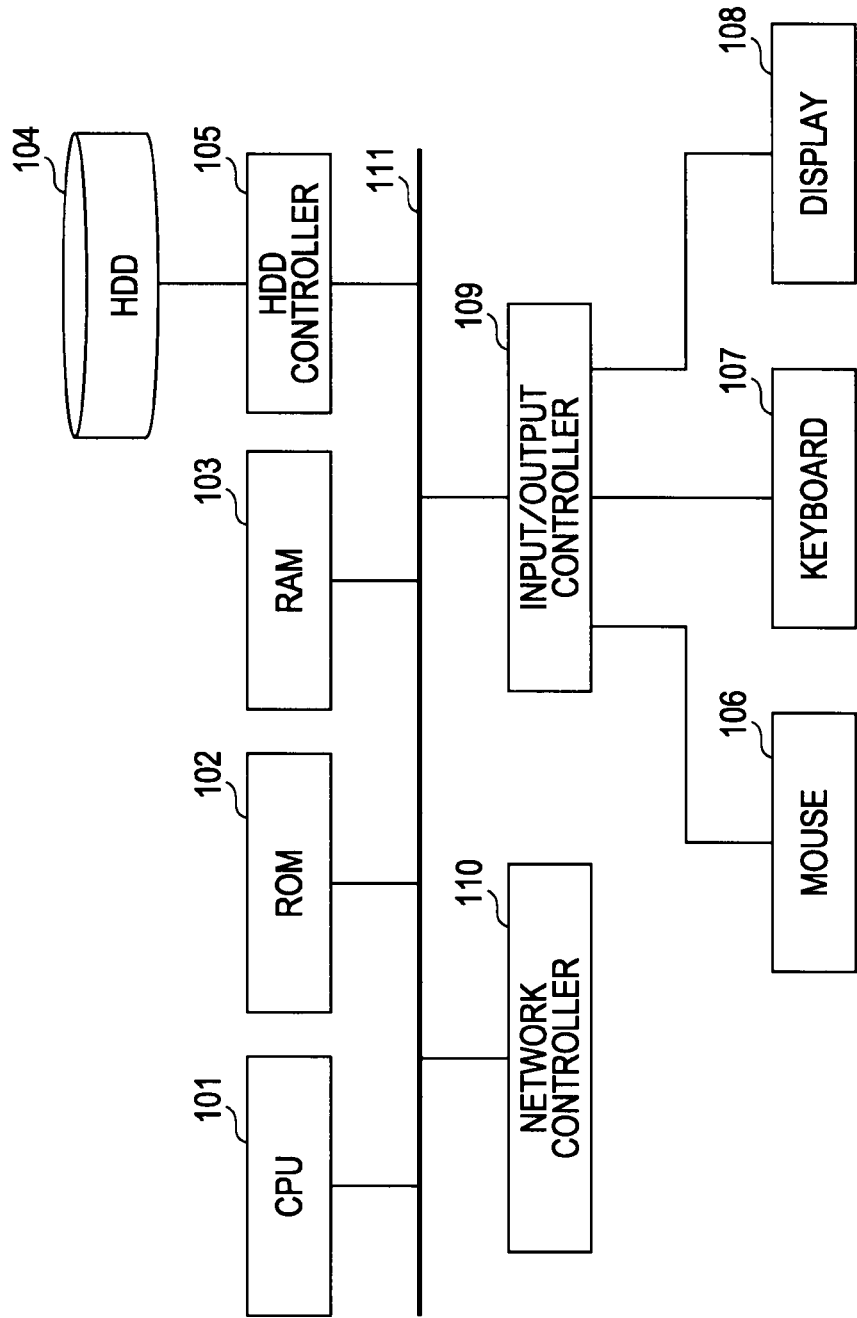
FIG. 8 is a block diagram showing the hardware configuration of a computer that executes a program delivery control program according to the embodiment.

FIG. 8 is a block diagram showing the hardware configuration of a computer that executes the program delivery control program according to the embodiment. In the hardware configuration of the computer, a CPU (Central Processing Unit) 101, a ROM (Read Only Memory) 102, a RAM (Random Access Memory) 103, a HDD (Hard Disk Drive) 104, a HDD controller 105, a mouse 106, a keyboard 107, a display 108, an input/output controller 109, and a network controller 110 are connected by a bus 111.

The program delivery control program according to the embodiment to be discussed later is stored in the HDD 104, read into the RAM 103 for execution, and executed by the CPU 101. Besides an electronic calculator such as a personal computer, the computer may also be incorporated in an electronic apparatus capable of handling information such as a video recording/playing device or a portable terminal. The program delivery control program according to the embodiment may also be stored in a storage medium such as a CD-ROM or distributed via a network.

[Flow of Information]

Figure 9:
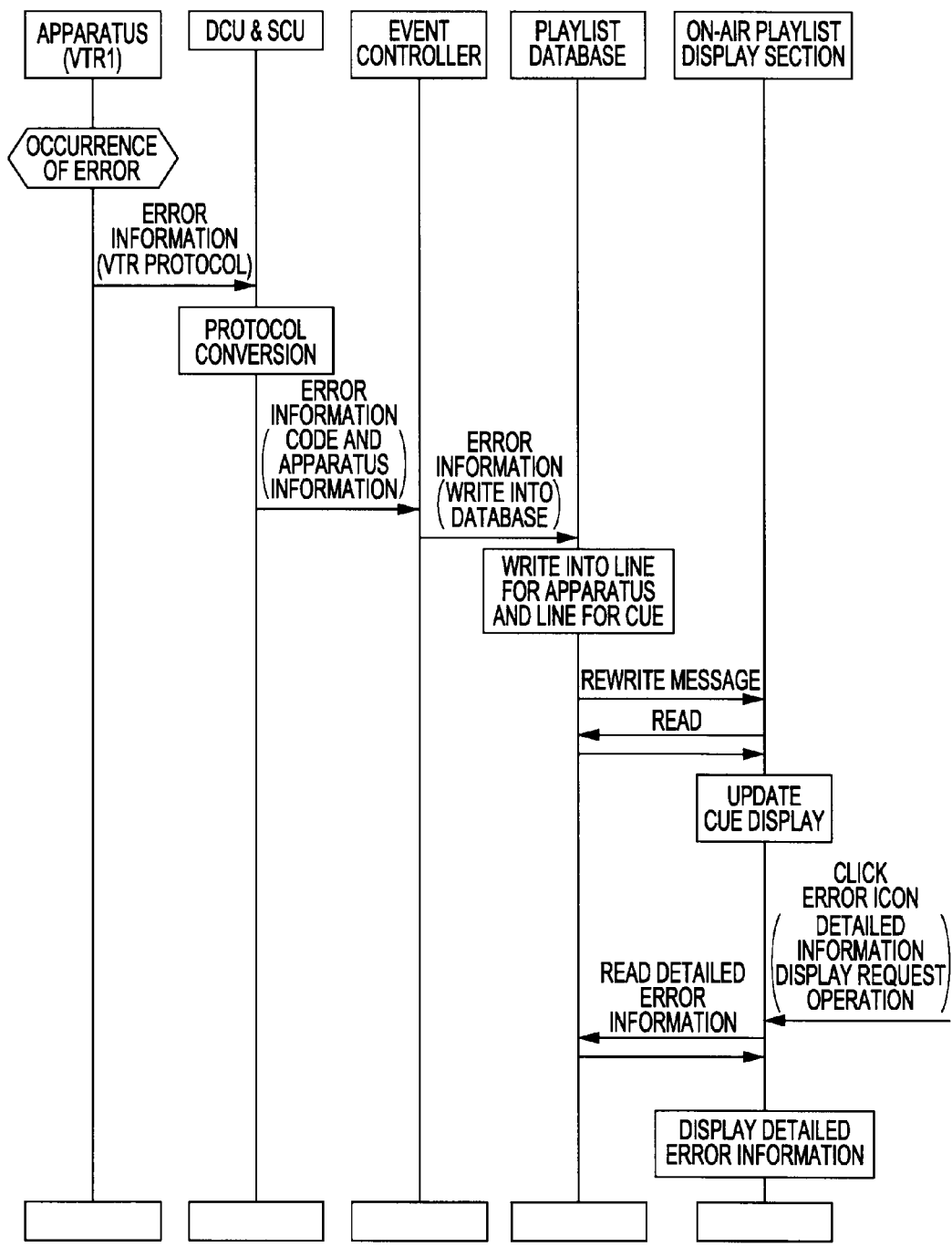
FIG. 9 is a timing chart illustrating an information processing program according to the embodiment.

FIG. 9 is a timing chart illustrating an information processing program according to the embodiment. In the drawing, the flow of information between the apparatus, the device control unit (DCU) and the system control unit (SCU), the event controller, the playlist database, and the on-air playlist display section is shown.

The playlist database stores a playlist in which lines/records corresponding to cues (items) forming program information are formed. Also, the playlist database is provided with a storage area for lines/records corresponding to apparatuses. Examples of the apparatuses include a VTR, a video clip server (substantially synonymous with a DDR (Digital Disk Recorder)), an audio clip server, an audio mixer, a mixer panel, and a camera, which refer not to the types of the apparatuses but to the actual apparatuses themselves. For example, if three VTRs, namely VTR1, VTR2, and VTR3, are provided in the system, the playlist database is provided with a storage area with three lines/records corresponding to the three VTRs.

First, apparatuses necessary for broadcast are controlled in accordance with the order of cues (items) on the playlist to be broadcast. When an error occurs in an apparatus (for example, VTR1), the apparatus sends error information to the system control unit (SCU) via the device control unit (DCU). The error information is subjected to a protocol conversion. The system control unit (SCU) transmits the error information after the protocol conversion to the event controller.

When the error information is received, the event controller writes the error information into the playlist database. At the same time, the event controller also writes the error information into a line corresponding to a cue (item) on the playlist for which the apparatus is used (a line with information of use of the apparatus). Information written into the line corresponding to the cue is simple (only the type of the error), and detailed information is available by referencing the line for the apparatus.

Further, when the error information is written, the playlist database sends a rewrite message to the on-air playlist display section. The rewrite message is also sent to a playlist viewer displaying the playlist including the cue (item) into which the error information is written.

Next, when the rewrite message is received, the on-air playlist display section accesses the playlist database and reads necessary information to update the display of the playlist on the screen. As a result, a graphic representing an error is displayed in the "ERROR" field for a cue (item) for which the apparatus with the error is used.

When the operator specifies the graphic representing an error by double-clicking with the mouse or the like, the details of the error are displayed in a different space in the area in which the playlist is displayed (for example, an error monitor or a dialog box). The details of the error are displayed by the on-air playlist display section reading the error information registered in a line corresponding to the apparatus in the playlist database.

When the on-air playlist display section is started, the on-air playlist display section reads information from the playlist database to display the information. Therefore, if error information is contained in the information, a graphic representing an error is displayed for the subject cue (item). In the case where an apparatus recovers from an error having occurred, the recovery from the error (to the normal state) is processed in the same way as the transmission of error information described above to update the display of the playlist such that an error indication is removed. For example, in the case where the absence of a tape in a VTR is recognized as an error, the error is resolved when an operator inserts a tape, and the resolution of the error is confirmed in the display of the playlist.

In the case where a button of the shot box such as the "TAKE" button is operated to cause cues (items) to progress or proceed to the next segment of a program, a cue-up command may accordingly be sent to an apparatus such as a VTR for preparation. At this time, cue-up operation may not succeed to cause an error so that error information may be returned. Also in this case, a graphic representing an error is displayed in the "ERROR" field for the cue (item) in the same way as described above. Therefore, apparently, an error indication is displayed along with the progress. Thus, preparation may be performed for an apparatus in accordance with the role of the apparatus in an item before the item is on air.

The structure (lines) of the playlist database, the flow of error information, and display update have been described above. Other examples demonstrating the same effect include the following.

(1) Lines/records corresponding to apparatuses are not provided, or error information is not written into the lines/records corresponding to apparatuses but stored in all the lines/records for cues (items) for which an apparatus with an error is used (for which error information is received).

(2) The "rewrite message" is not transmitted, but the on-air playlist display section or the like regularly performs polling (reads the content of the playlist database) to check the content, and updates the display when there is any change.

(3) Error information itself is transmitted along with the transmission of the "rewrite message".

(4) Error information is not written into lines/records for cues (items), but the on-air playlist display section or the like infallibly checks for any error information in a line corresponding to a corresponding apparatus when the on-air playlist display section reads the content of the playlist database for display update, and reflects any error in the display.

(5) Various other changes may be made. For example, error information may be stored in a space outside the database.

Thus, having error information obtainable from apparatuses reflected in the display of items on the playlist allows the operator to recognize an error of an apparatus before an item is broadcast.

In the flow described above, in the case where error information is provided in correspondence with a cue (item) on the playlist, the on-air playlist display section may give the event controller a command to skip the relevant cue (item). For example, the on-air playlist display section may give a command to automatically skip a cue (item) with error information only in the case where the order of priority added to the error information is the highest. Also, for example, the system control unit (SCU) may be configured to regularly communicate with apparatuses to obtain the state of the apparatuses, and in the case where a response is not returned from a certain apparatus, the system control unit (SCU) may assume that an abnormality such as a power failure has occurred in the apparatus to generate and process error information on the apparatus by itself.

[Process Performed in Playlist Database]

Figure 10:
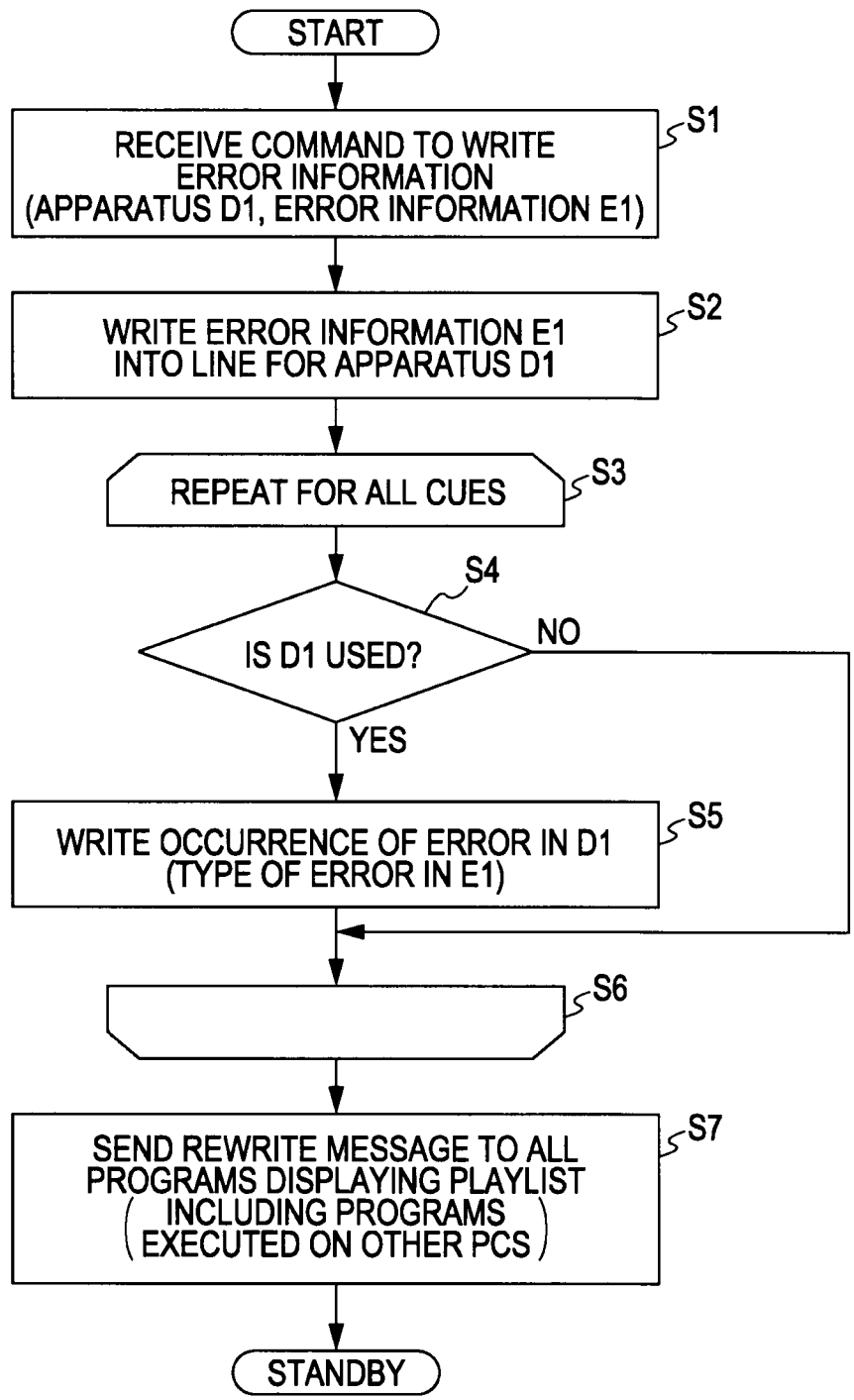
FIG. 10 is a flowchart illustrating the flow of a process performed in a playlist database.

FIG. 10 is a flowchart illustrating the flow of a process performed in the playlist database. First, when the playlist database receives a command to write error information (step S1), error information (here referred to as "error information E1") is written into a line in the playlist database for an apparatus that transmitted the error information (here referred to as an "apparatus D1") (step S2).

Then, processes in step S3 to step S6 are repeated for all the cues (items) on the playlist. First, it is determined whether or not the apparatus D1 is used in a cue (item) on the playlist (step S4). If the apparatus D1 is not used, the process proceeds to the next cue (item). If the apparatus D1 is used, occurrence of the error in the apparatus D1 (the type of the error in the error information E1) is written in correspondence with the cue (item) on the playlist for which the apparatus D1 is used (step S5). These processes are repeated for all the cues (items) (step S6).

Then, a message indicating that the playlist has been rewritten is transmitted to programs displaying the playlist (for example, the on-air playlist display section and the playlist viewer) (step S7). When the message sent from the playlist database is received, the programs displaying the playlist perform a process for acquiring the rewritten playlist from the playlist database. This allows the updated error information to be displayed for the subject cue (item) on the playlist.

In the case where it is found by reference to the playlist that an error having occurred affects the current or directly following cue (item), the operator may switch to a video in an emergency system, manually choose not to use a video from an apparatus with the error, or delete or skip the segment not to use the segment. Since the system includes the switcher 31 and an operation unit, such as the shot box 32, that allows manual operation of the switcher 31, measures against the error may be taken by manually switching videos. In the case where a "TAKE" operation is input from the shot box 32 to cause the playlist to progress, such progress may be stopped until the error is resolved. In the case where the playlist is configured to progress as the time elapses, such progress may be temporarily stopped by manual operation. Deletion or skipping of an item in the playlist is coordinated with the NRCS side via the MOS gateway 23, and therefore deletion or skipping is also synchronously performed in the progress on the NRCS side to cause no issue in association with synchronization.

In the case where an error having occurred affects a cue (item) a little ahead, operation is performed in an attempt to resolve the error by the broadcast of the cue (item). If the error is resolved, which is confirmed by the disappearance of the error indication, broadcast is performed on schedule. If the error is not resolved, the segment is deleted to recompose the program without using the segment. This allows to take appropriate measures in accordance with the position in the program or the like of the cue (item) affected by the apparatus with the error. In the example described above, the error indication EM is displayed in the "ERROR" field for each item on the playlist. However, the error indication EM may be implemented by changing the display color of the entirety of the relevant item, changing the display color of the frame of the relevant item, or changing the color of the characters for the relevant item, for example. Displaying an error indication at the position of the relevant item allows a seeing person to immediately recognize how much time is left from the item being currently broadcast until the item to be affected by the error.

The present application contains subject matter related to that disclosed in Japanese Priority Patent Application JP 2009-149602 filed in the Japan Patent Office on Jun. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A program delivery control system comprising: a memory configured to store a playlist indicating a play order of items forming a program; apparatus control circuitry configured to control an apparatus on the basis of the playlist stored in the memory and configured to cause the memory to store error information sent from the apparatus in correlation with the apparatus that issued the error information; and playlist display control circuitry configured to control so as to display the playlist stored in the memory on a screen with an item being played indicated as such and, in a case where the error information is stored, with an item for which the apparatus that issued the error information is necessary provided with an error indication, wherein the error information includes information of an inability of the apparatus to function as controlled by the apparatus control circuitry on the basis of the playlist, and wherein the playlist display control circuitry is configured to calculate a time remaining from an item currently on air to the item for which the apparatus issued the error information.

2. The program delivery control system according to claim 1,
wherein the apparatus control circuitry is configured to determine an order of priority in accordance with a content of an error for the error information sent from the apparatus, and
the playlist display control circuitry is configured to cause the playlist to be displayed on the screen with the error information displayed in accordance with the order of priority.

3. The program delivery control system according to claim 2, wherein the playlist control circuitry is configured to change a form of the error information according to the order of priority.

4. The program delivery control system according to claim 3, wherein the playlist control circuitry is configured to change the form of the error information by flashing the error information or changing a color of the error information.

5. The program delivery control system according to claim 1,
wherein in response to a user selecting the item with the error indication on the playlist displayed on the screen, the playlist display control circuitry is configured to perform control so as to display a content of the error information corresponding to the selected item on the screen.

6. The program delivery control system according to claim 1,
wherein in a case where a plurality of pieces of error information are added in correlation with the items on the playlist displayed on the screen and an order of priority is prescribed for the pieces of error information, the playlist display control circuitry is configured to cause the plurality of pieces of error information to be displayed in accordance with the order of priority.

7. The program delivery control system according to claim 1,
wherein the apparatus control circuitry is configured to receive the error information in accordance with a protocol corresponding to the apparatus, and cause the memory to store the error information in a form corresponding to a format of the playlist.

8. The program delivery control system according to claim 7, wherein the protocol corresponding to the apparatus is unique to the apparatus.

9. The program delivery control system according to claim 7, wherein the protocol corresponding to the apparatus is a format different than that of the format of the playlist.

10. The program delivery control system according to claim 1, wherein the apparatus includes a plurality of apparatuses connected to the apparatus control circuitry.

11. The program delivery control system according to claim 10, wherein the plurality of apparatuses are each connected to the apparatus control circuitry via a LAN connection.

12. The program delivery control system according to claim 1, wherein the error information includes information indicating that communication with the apparatus is not established.

13. The program delivery control system according to claim 1, wherein the playlist display control circuitry is configured to perform control so as to display the time remaining in a decreasing manner on the screen.

14. The program delivery control system according to claim 1, wherein the playlist display control circuitry is configured to update the error information added to the playlist displayed on the screen at a timing at which items to be broadcast on the playlist progress.

15. The program delivery control system according to claim 14, wherein the playlist display control circuitry is configured to update the error information added to the playlist displayed on the screen during a broadcast of the program.

16. A program delivery control method comprising the steps of:
controlling an apparatus on the basis of a playlist indicating a play order of items forming a program; receiving and storing error information sent from the apparatus; selecting an item on the playlist for which the apparatus is necessary to store the error information in correlation with the selected item; and calculating a time remaining from an item currently on air to the item for which the apparatus issued the error information, wherein the error information includes information of an inability of the apparatus to function as controlled on the basis of the playlist.

17. A program delivery control method comprising the steps of:
reading a playlist indicating a play order of items forming a program from a storage section; when the read playlist is displayed on a screen and in a case where error information on an apparatus corresponding to an item on the playlist is stored, displaying an error indication at a position of the item corresponding to the error information; and calculating a time remaining from an item currently on air to the item for which the apparatus issued the error information, wherein the error information includes information of an inability of the apparatus to function as controlled on the basis of the playlist.

\* \* \* \* \*